US012203604B1

(12) United States Patent
Lin

(10) Patent No.: US 12,203,604 B1
(45) Date of Patent: Jan. 21, 2025

(54) FILAMENT LIGHT SOURCE ASSEMBLY, FILAMENT LAMP STRING AND FILAMENT BULB

(71) Applicant: Zhongshan Chengyuan Photoelectric Technology Co., Ltd., Zhongshan (CN)

(72) Inventor: Guangpeng Lin, Zhongshan (CN)

(73) Assignee: Zhongshan Chengyuan Photoelectric Technology Co., Ltd., Zhongshan (CN)

( * ) Notice: Subject to any disclaimer, the term of this patent is extended or adjusted under 35 U.S.C. 154(b) by 0 days.

(21) Appl. No.: 18/777,731

(22) Filed: Jul. 19, 2024

(30) Foreign Application Priority Data

Jul. 1, 2024 (CN) ........................ 202410872391.X

(51) Int. Cl.

*F21K 9/238* (2016.01)
*F21K 9/232* (2016.01)
*F21V 23/00* (2015.01)
*F21Y 103/10* (2016.01)
*F21Y 115/10* (2016.01)

(52) U.S. Cl.

CPC .............. *F21K 9/238* (2016.08); *F21K 9/232* (2016.08); *F21V 23/008* (2013.01); *F21Y 2103/10* (2016.08); *F21Y 2115/10* (2016.08)

(58) Field of Classification Search

CPC ......... F21V 23/008; F21K 9/238; F21K 9/232
See application file for complete search history.

(56) References Cited

U.S. PATENT DOCUMENTS 11,473,735 B2 * 10/2022 Chen ....................... F21K 9/232
2019/0086037 A1 * 3/2019 Cairns ................... F21V 23/006
2020/0263838 A1 * 8/2020 Pyshos .................. F21V 23/003

* cited by examiner

*Primary Examiner* — Arman B Fallahkhair
(74) *Attorney, Agent, or Firm* — Birchwood IP

(57) ABSTRACT

The present invention discloses a filament light source assembly, a filament lamp string and a filament bulb. The filament light source assembly comprises a glass fiber plate and a plastic fixing member. In the present technical solution, LED chips are provided on the glass fiber plate, the glass fiber plate is fixed on the plastic fixing member, and an iron wire bracket is not needed as a supporting component. Moreover, after the glass fiber plate and the plastic fixing member are assembled, a plug-in connection space is formed, and is used for plug-in connection and fixation of two external conductive terminals, such that the conductive terminals are electrically connected to two pads. In addition, since no iron wire bracket needs to be used as a supporting component in the present solution, light emitted from a light source is not blocked, thereby improving the light emission effect.

10 Claims, 7 Drawing Sheets

FILAMENT LIGHT SOURCE ASSEMBLY, FILAMENT LAMP STRING AND FILAMENT BULB

CROSS-REFERENCE TO RELATED APPLICATIONS

This application claims priority to Chinese Patent Application No. 202410872391.X, filed on Jul. 1, 2024, which is hereby incorporated by reference in its entirety.

TECHNICAL FIELD

The present invention relates to the technical field of lighting lamps, and more specifically to a filament light source assembly, a filament lamp string and a filament bulb.

BACKGROUND

LED lamps occupy a huge share in the lighting market, in which filament-type LED lamps are particularly favored by customers for retro, casual and romantic lighting effects and unique models thereof.

At present, the production process of LED filament lamps on the market is extremely complicated and costly, and has potential risks in reliability and quality. The reasons are as follows: first, an existing LED filament light source needs an iron wire bracket for support, and the filament light source needs to be connected to the iron wire bracket by butt soldering or spot soldering, to form a loop and support for the filament light source; second, after the existing filament light source is butt-soldered or spot-soldered to the iron wire bracket, the iron wire bracket needs to be butt-soldered or spot-soldered to a thinner iron wire, and the thin iron wire serves as a lead to be electrically connected to a lamp cap; third, the existing LED filament light source requires an external resistor, and by using a resistor provided with a lead pin, one end of the lead pin is butt-soldered to the iron wire bracket, and on the other end, a resistor lead is electrically connected to the lamp cap; fourth, after the iron wire bracket of the existing filament light source passes through a plastic fixing member, the plastic member further needs to be pressed, such that the plastic member tightly clamps the iron wire; fifth, the existing LED filament light source adopts a ceramic plate as a substrate, and the ceramic substrate is very easy to break, causing a light source of the ceramic substrate to be very easy to break during transportation and assembling application, resulting in low production yield; sixth, after the existing LED filament light source is butt-soldered or spot-soldered to the iron wire bracket, tension and stress of the iron wire bracket cause a connecting solder joint between the bracket and the light source to desolder; seventh, if pin positions of the existing LED filament light source and the iron wire bracket are contaminated or a coating is oxidized, loose soldering will be caused, which will easily cause desoldering and false soldering problems, thus, it can be seen that the assembling process of an existing LED filament bulb is complicated and cumbersome, has low production efficiency and low yield, and has great potential risks in product quality and reliability; and eighth, since the light source of the existing filament bulb needs to be supported by using the iron wire bracket, the iron wire bracket blocks light emitted from the light source, resulting in a dark region and a shadow region on all filament bulb products having colored shells.

SUMMARY

In order to solve one or more of the above-mentioned technical problems, the purpose of the present invention is to provide a filament light source assembly, a filament lamp string and a filament bulb. The filament light source assembly, the filament lamp string and the filament bulb disclosed in the present invention all adopt a solder-free and iron-wire-bracket-free technique.

The technical solutions adopted by the present invention to solve the problem are:

A filament light source assembly comprises a glass fiber plate and a plastic fixing member.

A plurality of LED chips, a negative electrode pad and a positive electrode pad are provided on one face of the glass fiber plate. A phosphor dielectric layer is further provided on the glass fiber plate. The phosphor dielectric layer covers each of the LED chips. The positive electrode pad, the negative electrode pad and the plurality of LED chips form an energized loop. The positive electrode pad and the negative electrode pad are provided at a bottom end of the glass fiber plate.

The plastic fixing member is provided with a channel passing through an upper end face and a lower end face. One face of the glass fiber plate on which the positive electrode pad and the negative electrode pad are provided is defined as a functional face, and the other face of the glass fiber plate is defined as a non-functional face. The bottom end of the glass fiber plate is inserted into the channel of the plastic fixing member. Two sides of the glass fiber plate abut against an inner side of the channel of the plastic fixing member. A gap between the functional face of the glass fiber plate and the channel of the plastic fixing member is defined as a plug-in connection space. The plug-in connection space is used for plug-in connection and fixation of two external conductive terminals, such that the two conductive terminals are electrically connected to the positive electrode pad and the negative electrode pad in a one-to-one correspondence mode.

As a further improvement of the above-mentioned technical solution, the glass fiber plate is divided into a pad section and a chip section. The LED chips are provided on the chip section of the glass fiber plate. The positive electrode pad and the negative electrode pad are provided on the pad section of the glass fiber plate. The width of the pad section is greater than the width of the chip section. The pad section of the glass fiber plate is inserted into the channel of the plastic fixing member. A distance between the negative electrode pad and the positive electrode pad is 1 mm to 8 mm.

As a further improvement of the above-mentioned technical solution, the channel comprises a limiting portion and an abutting portion which are in communication with each other. The shape and size of the limiting portion of the channel are consistent with the shape and size of the chip section of the glass fiber plate. The width of the abutting portion of the channel is consistent with the width of the pad section of the glass fiber plate. Two sides of the pad section of the glass fiber plate are connected to an inner side of the abutting portion of the channel. A gap between the functional face of the glass fiber plate and the inner side of the abutting portion of the channel is the plug-in connection space.

As a further improvement of the above-mentioned technical solution, the LED chips are all flip-chip LED chips.

As a further improvement of the above-mentioned technical solution, the present technical solution further comprises a current limiting resistor. The current limiting resistor is provided on the functional face of the glass fiber plate, or is provided independently of the glass fiber plate. The energized loop is formed among the positive electrode pad, the negative electrode pad, the current limiting resistor and the plurality of the LED chips.

The present invention further discloses a filament lamp string, which comprises a plurality of lighting units. The plurality of lighting units are connected in series or in parallel to each other. The lighting units each comprise a lamp holder, a lamp cover and the filament light source assembly. The bottom of the lamp cover is fixedly connected to the lamp holder. Two conductive posts provided vertically and parallel to each other are mounted on the lamp holder. The conductive posts serve as the conductive terminals. The two conductive posts are placed in the plug-in connection space of the filament light source assembly, such that the two conductive posts are electrically connected to the positive electrode pad and the negative electrode pad in a one-to-one correspondence mode.

As a further improvement of the above-mentioned technical solution, the lamp holder and the plastic fixing member are integrated.

The present invention further discloses a filament bulb, which comprises a lamp cap, a bulb shell, two conductive filaments and the filament light source assembly. The conductive filaments serve as the conductive terminals. The plastic fixing member is mounted at a bottom position inside the bulb shell, such that the glass fiber plate is placed in the bulb shell. A top end of the lamp cap is fixed at a bottom position outside the bulb shell. One end of each of the two conductive filaments is placed in the plug-in connection space of the filament light source assembly and connected to the positive electrode pad and the negative electrode pad in a one-to-one correspondence mode, and the other end of each of the two conductive filaments is electrically connected to the lamp cap, respectively.

As a further improvement of the above-mentioned technical solution, the upper end face of the plastic fixing member is provided with two limiting slots. The conductive filaments each comprise a lapping section and a joining section. One end of the lapping section is connected to one end of the joining section, and the lapping section and the joining section are perpendicular to each other. The lapping section of each conductive filament is placed in the respective limiting slot of the plastic fixing member. The joining section of each conductive filament is placed in the plug-in connection space of the filament light source assembly.

As a further improvement of the above-mentioned technical solution, guide protrusions are symmetrically provided on an outer side of the plastic fixing member along an axial direction of the plastic fixing member. Outer sides of the guide protrusions are arc-shaped. A top end of each guide protrusion is provided with an inclined face.

A middle position of the channel of the plastic fixing member is divided into an upper half portion and a lower half portion by means of a partition. The upper half portion of the channel is in the shape of a flat cuboid. The lower half portion of the channel is cylindrical. The partition is provided with two through holes for communicating the upper half portion and the lower half portion of the channel. Cylindrical guide columns are provided on a lower end face of the partition at the positions of the through holes. A gap between the functional face of the glass fiber plate and the upper half portion of the channel is the plug-in connection space. The joining sections of the conductive filaments pass through the through holes of the channel and are electrically connected to the lamp cap.

As a further improvement of the above-mentioned technical solution, the plastic fixing member is entirely placed inside the bulb shell, and a distance between a bottom end of the plastic fixing member and a bottom end of the bulb shell is 0.5 mm to 2 mm.

The beneficial effects of the present invention are: in the present technical solution, the LED chips are provided on the glass fiber plate, and the glass fiber plate is fixed on the plastic fixing member, without the need for using an iron wire bracket as a supporting component. Moreover, after the assembling of the glass fiber plate and the plastic fixing member is completed, the plug-in connection space is formed, and is used for plug-in connection and fixation of the two external conductive terminals, such that the conductive terminals are electrically connected to the two pads. The above-mentioned design omits all steps related to the iron wire bracket, does not require spot-soldering operations related to the iron wire bracket, and eliminates the problems of desoldering and false soldering. In addition, since the use of the iron wire bracket as a supporting component is not required in the present solution, light emitted from a light source will not be blocked, thereby improving the light emission effect.

BRIEF DESCRIPTION OF DRAWINGS

The present invention will be further explained below in conjunction with the description of the accompanying drawings and specific embodiments.

DETAILED DESCRIPTION OF THE EMBODIMENTS

This section will describe the specific embodiments of the present invention in detail. The preferred embodiments of the present invention are shown in the accompanying drawings. The function of the accompanying drawings is to supplement the statement of the text part of the description with graphics, so that people can intuitively and vividly understand each technical feature and overall technical solution of the present invention. However, the accompanying drawings shall not be construed as a limitation to the protection scope of the present invention.

In the statement of the present invention, it should be understood that orientation statements, such as orientation or position relationships indicated by up, down, front, back, left, right, etc., are based on the orientation or position relationships shown in the accompanying drawings and are only to facilitate the statement of the present invention and simplify the statement, rather than indicate or imply that the device or element referred to must have a specific orientation, be constructed and operate in a specific orientation, and therefore should not be understood as a limitation to the present invention.

In the statement of the present invention, "several" means one or more, "a plurality of" means two or more, "greater than", "less than", and "more than", etc. are understood to exclude the original number, and above, below, within, etc. are understood to include the original number. If there is a statement of first and second, it is only for the purpose of distinguishing technical features, and cannot be understood as indicating or implying the relative importance or implicitly indicating the number of indicated technical features or implicitly indicating the order of indicated technical features.

In the statement of the present invention, unless otherwise explicitly specified, words such as setting, installation, and connection should be understood in a broad sense. Those skilled in the art can reasonably determine the specific meanings of the above words in the present invention in combination with the specific content of the technical solution.

Figure 1:
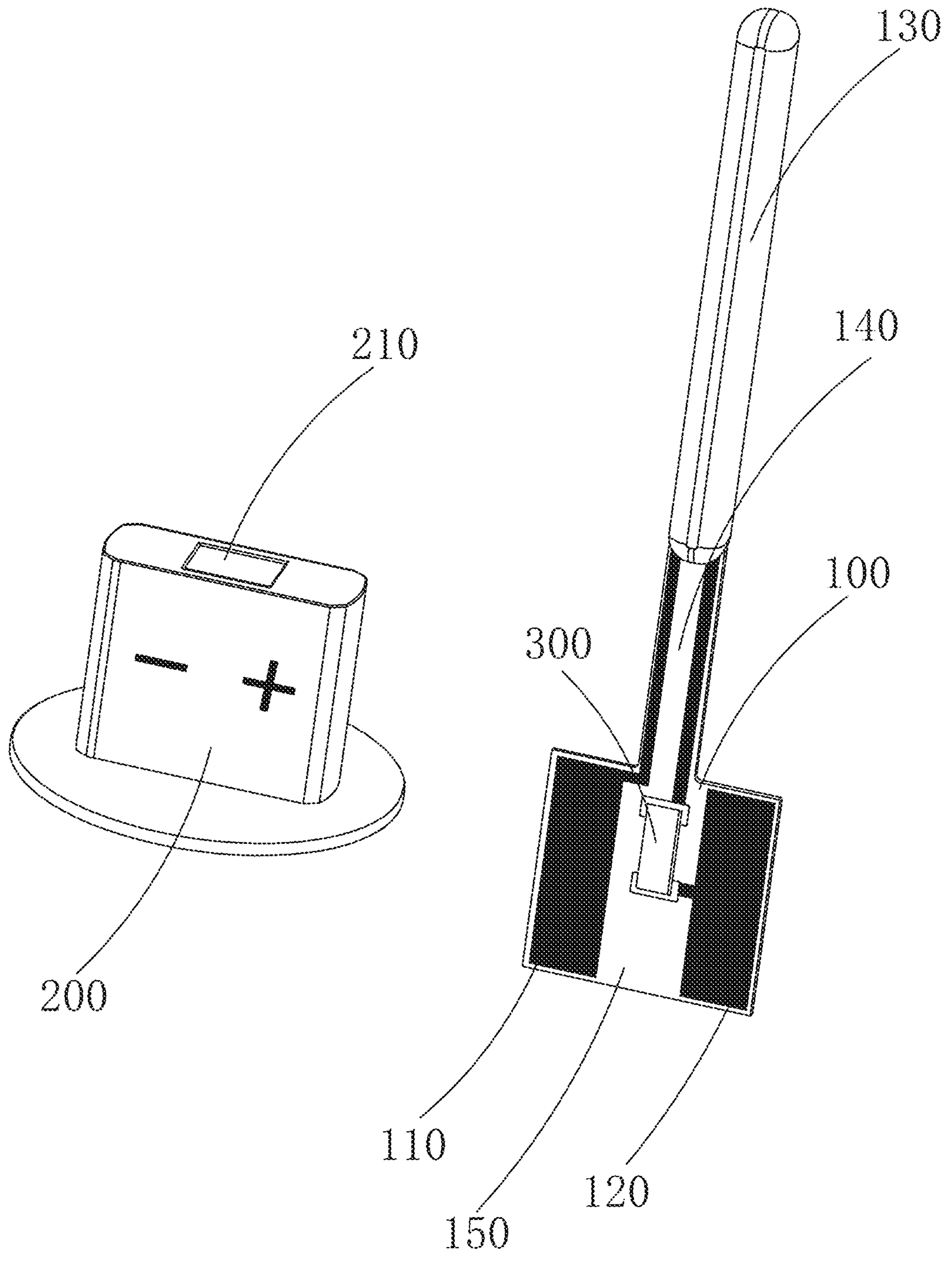
FIG. 1 is a schematic structural diagram of a filament light source assembly of the present invention.
Figure 2:
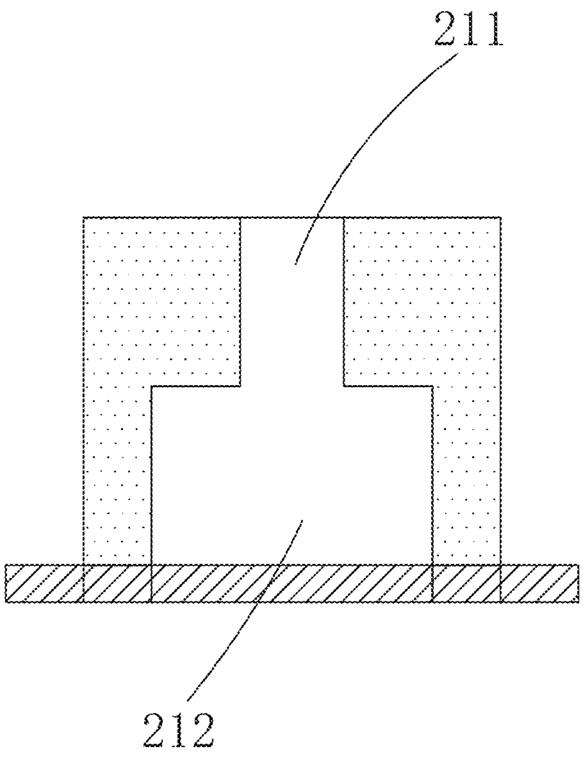
FIG. 2 is a cross-sectional view of a plastic fixing member of the present invention.
Figure 3:
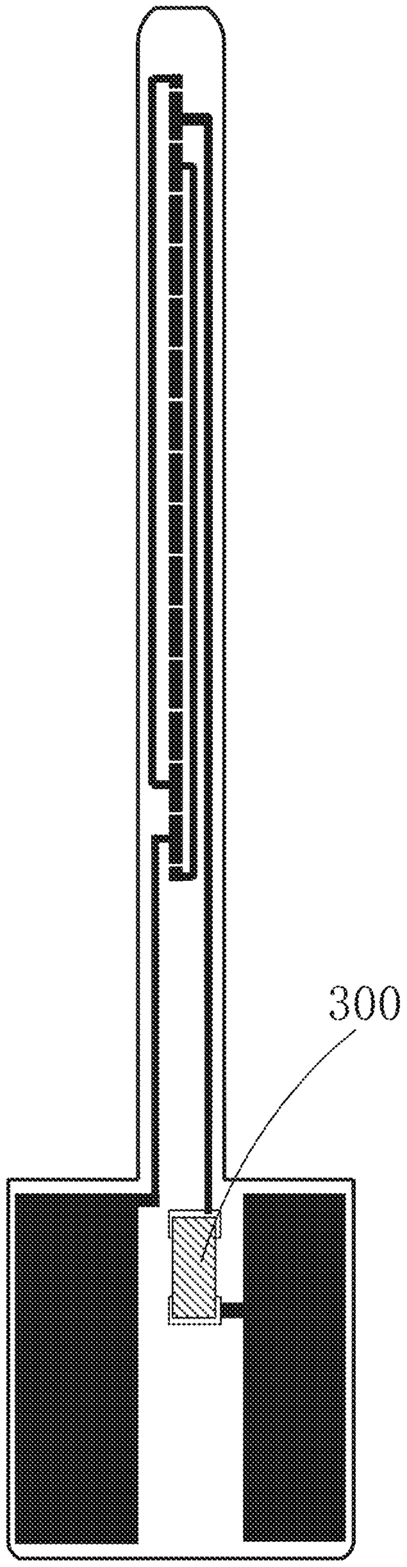
FIG. 3 is a schematic circuit diagram of the present invention.

Referring to FIGS. 1 to 3, the present application discloses a filament light source assembly. A first embodiment of the filament light source assembly comprises a plastic fixing member 200 and a strip-shaped glass fiber plate 100. The glass fiber plate 100 has a certain light transmittance.

A plurality of LED chips, a negative electrode pad 110 and a positive electrode pad 120 are provided on one face of the glass fiber plate 100. A phosphor dielectric layer 130 is further provided on the glass fiber plate 100. The phosphor dielectric layer 130 covers each of the LED chips. The positive electrode pad 120, the negative electrode pad 110 and the plurality of LED chips form an energized loop. The positive electrode pad 120 and the negative electrode pad 110 are provided at a bottom end of the glass fiber plate 100.

The plastic fixing member 200 is provided with a channel 210 passing through an upper end face and a lower end face. One face of the glass fiber plate 100 on which the positive electrode pad 120 and the negative electrode pad 110 are provided is defined as a functional face, and the other face of the glass fiber plate 100 is defined as a non-functional face. The bottom end of the glass fiber plate 100 is inserted into the channel 210 of the plastic fixing member 200. Two sides of the glass fiber plate 100 abut against an inner side of the channel 210 of the plastic fixing member 200. A gap between the functional face of the glass fiber plate 100 and the channel 210 of the plastic fixing member 200 is defined as a plug-in connection space. The plug-in connection space is used for plug-in connection and fixation of two external conductive terminals, such that the two conductive terminals are electrically connected to the positive electrode pad 120 and the negative electrode pad 110 in a one-to-one correspondence mode. In the present embodiment, the so-called conductive terminal is a strip-shaped conductive device having a certain diameter. Depending on actual circumstances, the conductive terminal may be configured to be rigid or flexible. In practical applications, the conductive terminal may be a columnar or linear device made of a variety of conductive materials.

Specifically, in the present embodiment, the LED chips are provided on the glass fiber plate 100, and the glass fiber plate 100 is fixed on the plastic fixing member 200, without the need for using an iron wire bracket as a supporting component. Moreover, after the assembling of the glass fiber plate 100 and the plastic fixing member 200 is completed, the plug-in connection space is formed, and is used for plug-in connection and fixation of the two external conductive terminals, such that the conductive terminals are in close contact with the two pads to achieve electrical connection. The above-mentioned design omits all steps related to the iron wire bracket, does not require spot-soldering operations related to the iron wire bracket, and eliminates the problems of desoldering and false soldering. In addition, since the use of the iron wire bracket as a supporting component is not required in the present embodiment, light emitted from a light source will not be blocked, thereby improving the light emission effect.

As a further preferred embodiment, in the present embodiment, the glass fiber plate 100 is divided into a pad section 150 and a chip section 140. The LED chips are provided on the chip section 140 of the glass fiber plate 100. The positive electrode pad 120 and the negative electrode pad 110 are provided on the pad section 150 of the glass fiber plate 100. The width of the pad section 150 is greater than the width of the chip section 140. The pad section 150 of the glass fiber plate 100 is inserted into the channel 210 of the plastic fixing member 200. A distance between the negative electrode pad 110 and the positive electrode pad 120 is 1 mm to 8 mm. This design of the present embodiment effectively prevents the two conductive terminals connected to the positive electrode pad 120 and the negative electrode pad 110 from being too close to each other after the assembling of the bulb is completed, thereby effectively avoiding short circuits.

As a further preferred embodiment, in the present embodiment, the channel 210 comprises a limiting portion 211 and an abutting portion 212 which are in communication with each other. The shape and size of the limiting portion 211 of the channel 210 are consistent with the shape and size of the chip section 140 of the glass fiber plate 100. The width of the abutting portion 212 of the channel 210 is consistent with the width of the pad section 150 of the glass fiber plate 100. Two sides of the pad section 150 of the glass fiber plate 100 are connected to an inner side of the abutting portion 212 of the channel 210. A gap between the functional face of the glass fiber plate 100 and the inner side of the abutting portion 212 of the channel 210 is the plug-in connection space. In order to improve the assembling efficiency of the filament light source assembly, in the present embodiment, the channel 210 is designed as the limiting portion 211 and abutting portion 212 which are in communication with each other, and the shape and size of the limiting portion 211 of the channel 210 are consistent with the shape and size of the chip section 140 of the glass fiber plate 100. During assembling, the chip section 140 of the glass fiber plate 100 can be quickly inserted from below the plastic fixing member 200 through the limiting portion 211 of the channel 210, and the pad section 150 of the glass fiber plate 100 is connected to the abutting portion 212 of the channel 210 of the plastic fixing member 200, so as to achieve assembling between the glass fiber plate 100 and the plastic fixing member 200.

As a further preferred embodiment, in the present embodiment, the LED chips are all flip-chip LED chips. Each of the LED chips is provided in a straight line on the glass fiber plate 100. The phosphor dielectric layer 130 is provided on one face of the glass fiber plate 100 having the LED chips or on both faces of the glass fiber plate 100. In the present embodiment, a connection structure, such as all in series connection, all in parallel connection, first series connection and then parallel connection, or first parallel connection and then series connection, can be selected as a connection structure among the LED chips.

As a further preferred embodiment, the present embodiment further comprises a current limiting resistor 300. The current limiting resistor 300 is provided on the functional face of the glass fiber plate 100, or is provided independently of the glass fiber plate 100. The current limiting resistor 300 is provided on the pad section 150 of the glass fiber plate 100. The energized loop is formed among the positive electrode pad 120, the negative electrode pad 110, the current limiting resistor 300 and the plurality of LED chips.

Figure 4:
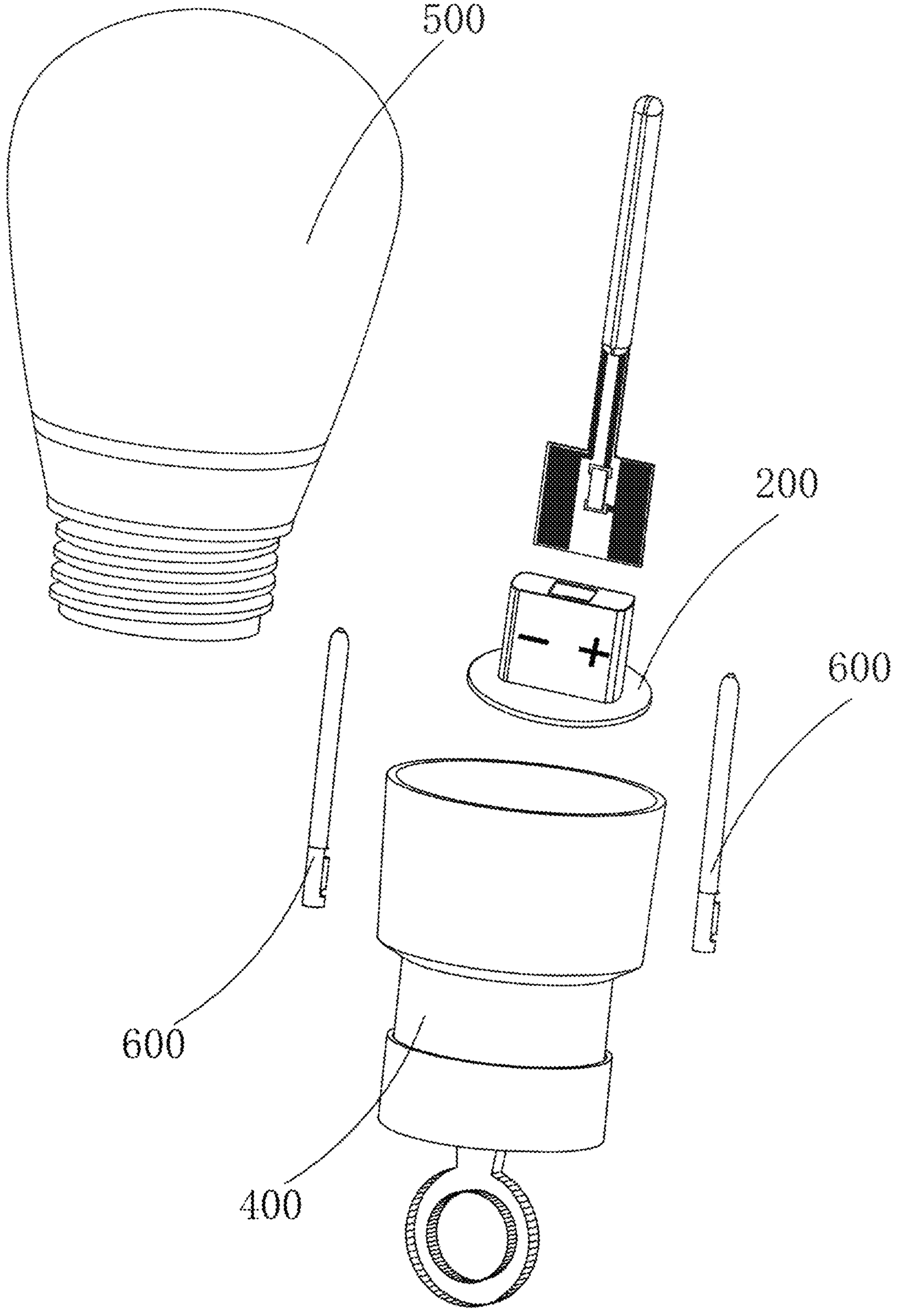
FIG. 4 is a schematic structural diagram of a first embodiment of a filament lamp string of the present invention.

Referring to FIG. 4, the present application further discloses a filament lamp string. A first embodiment of the filament lamp string comprises a plurality of lighting units. The plurality of lighting units are connected in series or in parallel to each other. The lighting units each comprise a lamp holder 400, a lamp cover 500 and the first embodiment of the filament light source assembly. The bottom of the lamp cover 500 is fixedly connected to the lamp holder 400. Two conductive posts 600 provided vertically and parallel to each other are mounted on the lamp holder 400. The conductive posts 600 serve as the conductive terminals. The two conductive posts 600 are placed in the plug-in connection space of the filament light source assembly, such that the two conductive posts 600 are electrically connected to the positive electrode pad 120 and the negative electrode pad 110 in a one-to-one correspondence mode.

Figure 5:
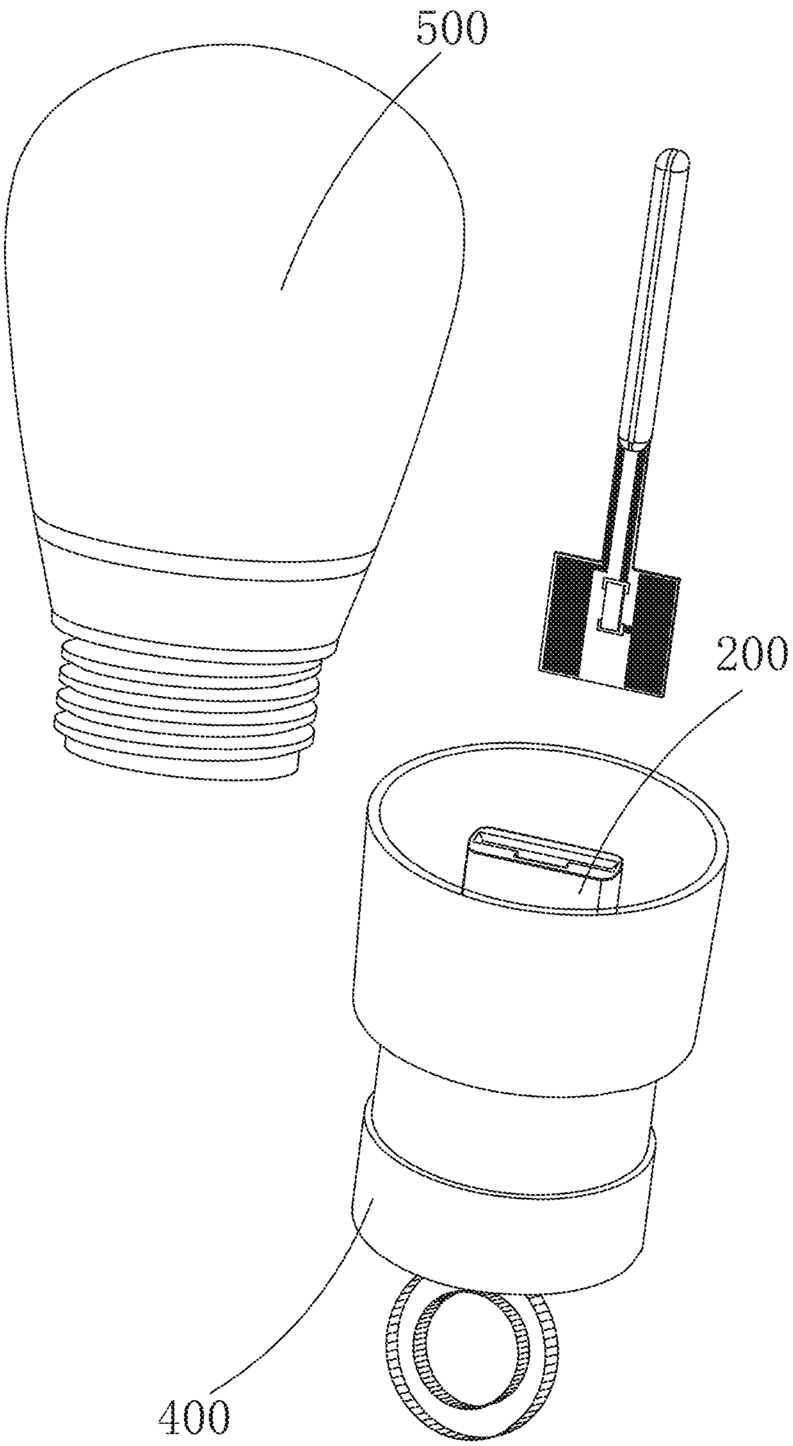
FIG. 5 is a schematic structural diagram of a second embodiment of a filament lamp string of the present invention.

Referring to FIG. 5, upon comparison, a difference between a second embodiment of the filament lamp string of the present application and the first embodiment lies in: in the second embodiment of the filament lamp string, the lamp holder 400 and the plastic fixing member 200 are integrated. In the present embodiment, there is no need to design the channel 210 of the plastic fixing member 200 as the limiting portion 211 and the abutting portion 212 which are in communication with each other. In this case, the glass fiber plate 100 can only be inserted into the channel 210 of the plastic fixing member 200 from an upper end of the plastic fixing member. In the present embodiment, the so-called lamp holder 400 and the plastic fixing member 200 are integrated, indicating that the lamp holder 400 and the plastic fixing member 200 are first mounted together to form a whole. A mode, such as screw-on fixation, snap-fit fixation, and direct insertion, may be adopted as a mounting mode between the lamp holder and the plastic fixing member. Naturally, before the lamp holder 400 and the plastic fixing member 200 are mounted together, the assembling between the conductive posts 600 and the plastic fixing member 200 need to be completed first.

Figure 6:
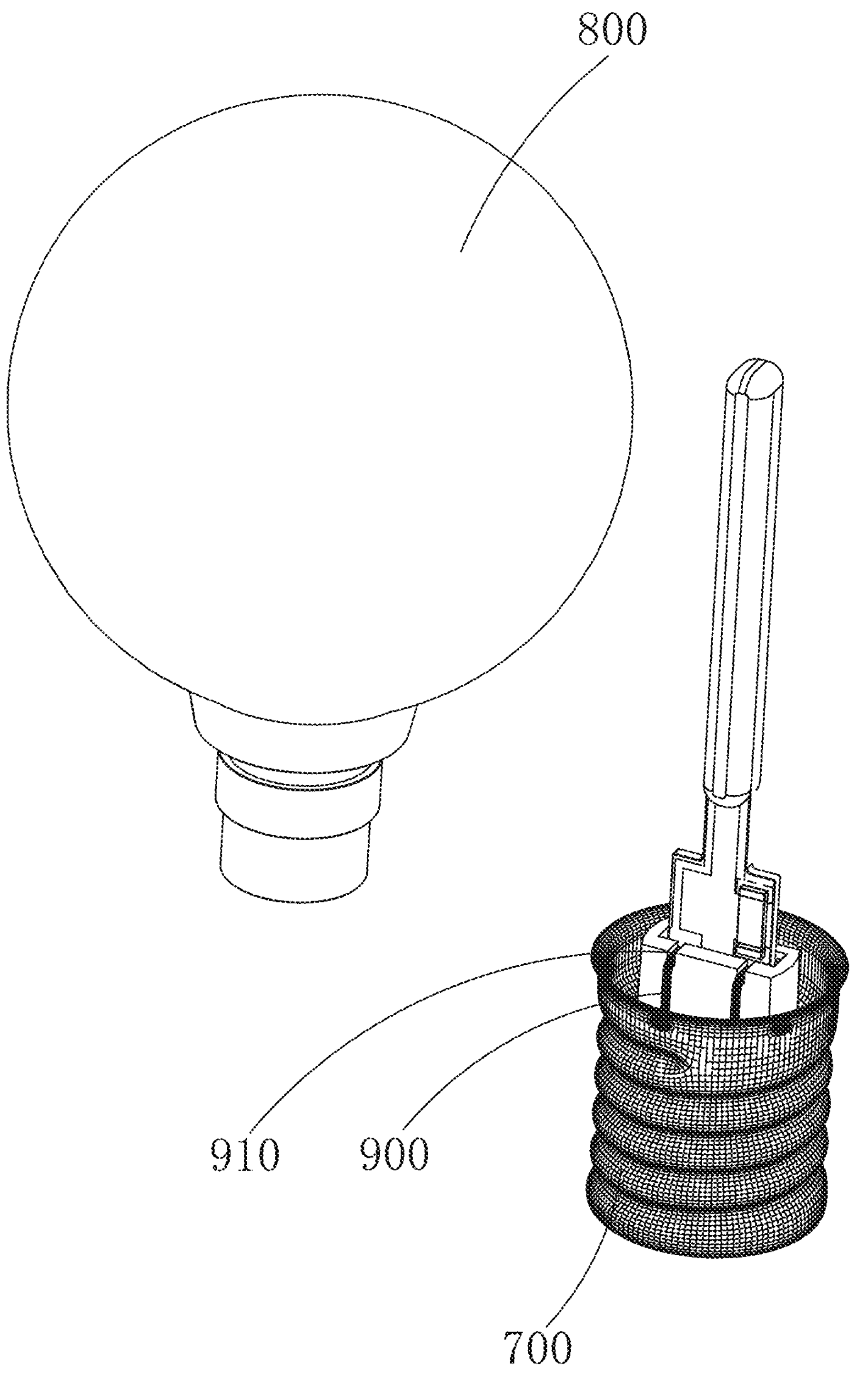
FIG. 6 is a schematic structural diagram of a filament bulb of the present invention (E27-type lamp cap)

Referring to FIG. 6, the present application further discloses a filament bulb. A first embodiment of the filament bulb comprises a lamp cap 700, a bulb shell 800, two conductive filaments 900 and the first embodiment of the filament light source assembly. The conductive filaments 900 serve as the conductive terminals. The plastic fixing member 200 is mounted at a bottom position inside the bulb shell 800, such that the glass fiber plate 100 is placed in the bulb shell 800. A top end of the lamp cap 700 is fixed at a bottom position outside the bulb shell 800. Top ends of the two conductive filaments 900 are placed in the plug-in connection space of the filament light source assembly, such that one end of each of the two conductive filament 900 is connected to the positive electrode pad 120 and the negative electrode pad 110 in a one-to-one correspondence mode. Bottom ends of the two conductive filaments 900 are electrically connected to the lamp cap 700, respectively.

As a further preferred embodiment, in the present embodiment, the upper end face of the plastic fixing member 200 is provided with two limiting slots 220. The conductive filaments 900 each comprise a lapping section 910 and a joining section. One end of the lapping section 910 is connected to one end of the joining section, and the lapping section 910 and the joining section are perpendicular to each other. The lapping section 910 of each conductive filament 900 is placed in the respective limiting slot 220 of the plastic fixing member 200. The joining section of each conductive filament 900 is placed in the plug-in connection space of the filament light source assembly.

Figure 7:
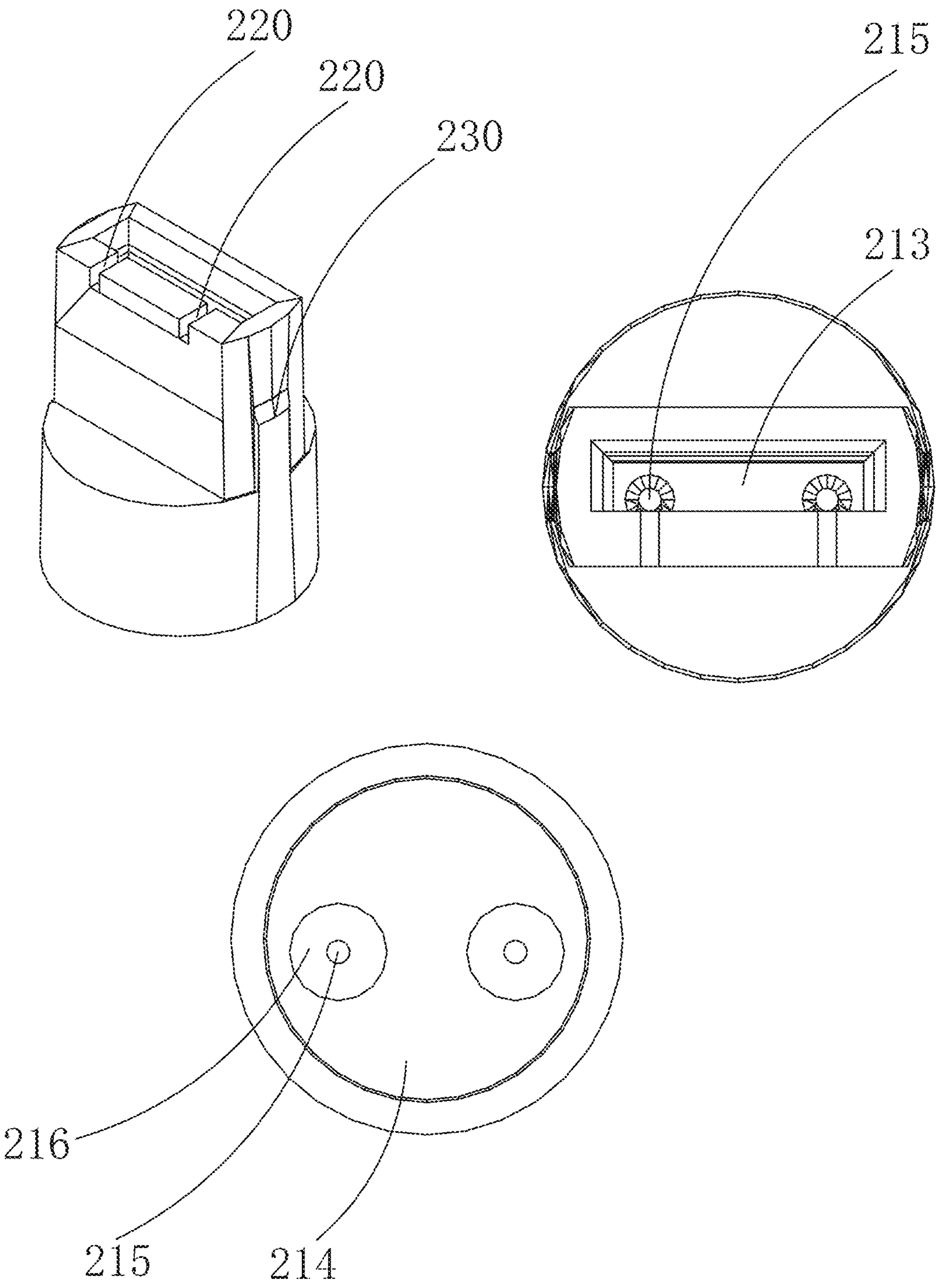
FIG. 7 is a perspective view, top view and bottom view of a plastic fixing member of a filament bulb of the present invention.

Referring to FIG. 7, as a further preferred embodiment, in the present embodiment, in order to further improve the convenience of bulb assembling, the structure of the plastic fixing member 200 is specially designed. First, in the present embodiment, guide protrusions 230 are provided on an outer side of the plastic fixing member 200 along an axial direction of the plastic fixing member. There are two guide protrusions 230, which are symmetrically provided on the outer side of the plastic fixing member 200. Outer sides of the guide protrusions 230 are arc-shaped. A top end of each guide protrusion 230 is provided with an inclined face. The arrangement of the guide protrusions 230 facilitates rapid and accurate plug-in mounting of the plastic fixing member 200 from the bottom of the bulb shell 800. In the present embodiment, there is no need to design the channel 210 of the plastic fixing member 200 as the limiting portion 211 and abutting portion 212 which are in communication with each other. A middle position of the channel 210 of the plastic fixing member 200 is divided into an upper half portion 213 and a lower half portion 214 by means of a partition. The upper half portion 213 of the channel 210 is in the shape of a flat cuboid. The lower half portion 214 of the channel 210 is cylindrical. The partition is provided with two through holes 215 for communicating the upper half portion 213 and the lower half portion 214 of the channel 210. Cylindrical guide columns 216 are provided on a lower end face of the partition at the positions of the through holes 215. During actual assembling, the pad section 150 of the glass fiber plate 100 is inserted into the upper half portion 213 of the channel 210 of the plastic fixing member 200. A gap between the functional face of the glass fiber plate 100 and the upper half portion 213 of the channel 210 is the plug-in connection space. The joining sections of the conductive filaments 900 pass through the through holes 215 of the channel 210 and are electrically connected to the lamp cap 700.

As a further preferred embodiment, in the present embodiment, the plastic fixing member 200 is entirely placed inside the bulb shell 800. A distance between a bottom end of the plastic fixing member 200 and a bottom end of the bulb shell 800 is 0.5 mm to 2 mm. A region, located below the plastic fixing member 200, in the bulb shell 800 is coated with glue. This design is applicable to E12-type lamp caps and E17-type lamp caps. The main reason is that filament bulbs of the E12-type lamp caps and E17-type lamp caps have a poor waterproof effect. If the above-mentioned design is not performed, the filament bulbs are prone to absorbing water vapor in environments, which easily reduces the service life of the filament bulbs and affects the lighting effect of the filament bulbs. It should be noted that the above-mentioned design is not only applicable to the E12-type lamp caps and E17-type lamp caps, but can also be applied to other types of lamp caps (such as E27-type lamp caps). However, considering actual application requirements, the above-mentioned two scenarios more critically require a sunken structure design of the plastic fixing member 200. In addition, in the present embodiment, whether the region, located below the plastic fixing member 200, in the bulb shell 800 needs to be coated with glue may be selected according to actual applications. Coating the region, located below the plastic fixing member 200, in the bulb shell 800 with glue is more conducive to achieving waterproof and moisture-proof effects.

The above are only preferred embodiments of the present invention, and are not intended to limit the patent scope of the present invention. Under the inventive concept of the present invention, equivalent structural transformations made using the contents of the description and drawings of the present invention, or directly or indirectly used in other relevant technical fields are all included in the patent protection scope of the present invention.

What is claimed is:

1. A filament light source assembly, wherein the filament light source assembly comprises a glass fiber plate (100) and a plastic fixing member (200);

a plurality of LED chips, a negative electrode pad (110) and a positive electrode pad (120) are provided on one face of the glass fiber plate (100), a phosphor dielectric layer (130) is further provided on the glass fiber plate (100), the phosphor dielectric layer (130) covers each of the LED chips, the positive electrode pad (120), the negative electrode pad (110) and the plurality of LED chips form an energized loop, and the positive electrode pad (120) and the negative electrode pad (110) are provided at a bottom end of the glass fiber plate (100); and the plastic fixing member (200) is provided with a channel (210) passing through an upper end face and a lower end face, one face of the glass fiber plate (100) on which the positive electrode pad (120) and the negative electrode pad (110) are provided is defined as a functional face, the other face of the glass fiber plate (100) is defined as a non-functional face, the bottom end of the glass fiber plate (100) is inserted into the channel (210) of the plastic fixing member (200), two sides of the glass fiber plate (100) abut against an inner side of the channel (210) of the plastic fixing member (200), a gap between the functional face of the glass fiber plate (100) and the channel (210) of the plastic fixing member (200) is defined as a plug-in connection space, and the plug-in connection space is used for plug-in connection and fixation of two external conductive terminals, such that the two conductive terminals are electrically connected to the positive electrode pad (120) and the negative electrode pad (110) in a one-to-one correspondence mode.

2. A filament bulb, wherein the filament bulb comprises a lamp cap (700), a bulb shell (800), two conductive filaments (900) and the filament light source assembly according to claim 1, the conductive filaments (900) serve as the conductive terminals, the plastic fixing member (200) is mounted at a bottom position inside the bulb shell (800), such that the glass fiber plate (100) is placed in the bulb shell (800), a top end of the lamp cap (700) is fixed at a bottom position outside the bulb shell (800), one end of each of the two conductive filaments (900) is placed in the plug-in connection space of the filament light source assembly and connected to the positive electrode pad (120) and the negative electrode pad (110) in a one-to-one correspondence mode, and the other end of each of the two conductive filaments (900) is electrically connected to the lamp cap (700), respectively.

3. The filament bulb according to claim 2, wherein the upper end face of the plastic fixing member (200) is provided with two limiting slots (220), the conductive filaments (900) each comprise a lapping section (910) and a joining section, one end of the lapping section (910) is connected to one end of the joining section, the lapping section (910) and the joining section are perpendicular to each other, the lapping section (910) of each conductive filament (900) is placed in the respective limiting slot (220) of the plastic fixing member (200), and the joining section of each conductive filament (900) is placed in the plug-in connection space of the filament light source assembly.

4. The filament bulb according to claim 3, wherein guide protrusions (230) are symmetrically provided on an outer side of the plastic fixing member (200) along an axial direction of the plastic fixing member, outer sides of the guide protrusions (230) are arc-shaped, and a top end of each guide protrusion (230) is provided with an inclined face; and a middle position of the channel (210) of the plastic fixing member (200) is divided into an upper half portion (213) and a lower half portion (214) by means of a partition, the upper half portion (213) of the channel (210) is in a shape of a flat cuboid, the lower half portion (214) of the channel (210) is cylindrical, the partition is provided with two through holes (215) for communicating the upper half portion (213) and the lower half portion (214) of the channel (210), cylindrical guide columns (216) are provided on a lower end face of the partition at the positions of the through holes (215), a gap between the functional face of the glass fiber plate (100) and the upper half portion (213) of the channel (210) is the plug-in connection space, and the joining sections of the conductive filaments (900) pass through the through holes (215) of the channel (210) and are electrically connected to the lamp cap (700).

5. The filament bulb according to claim 2, wherein the plastic fixing member (200) is entirely placed inside the bulb shell (800), and a distance between a bottom end of the plastic fixing member (200) and a bottom end of the bulb shell (800) is 0.5 mm to 2 mm.

6. The filament light source assembly according to claim 1, wherein the glass fiber plate (100) is divided into a pad section (150) and a chip section (140), the LED chips are provided on the chip section (140) of the glass fiber plate (100), the positive electrode pad (120) and the negative electrode pad (110) are provided on the pad section (150) of the glass fiber plate (100), a width of the pad section (150) is greater than a width of the chip section (140), the pad section (150) of the glass fiber plate (100) is inserted into the channel (210) of the plastic fixing member (200), and a distance between the negative electrode pad (110) and the positive electrode pad (120) is 1 mm to 8 mm.

7. The filament light source assembly according to claim 6, wherein the channel (210) comprises a limiting portion (211) and an abutting portion (212) which are in communication with each other, a shape and a size of the limiting portion (211) of the channel (210) are consistent with a shape and a size of the chip section (140) of the glass fiber plate (100), a width of the abutting portion (212) of the channel (210) is consistent with a width of the pad section (150) of the glass fiber plate (100), two sides of the pad section (150) of the glass fiber plate (100) are connected to an inner side of the abutting portion (212) of the channel (210), and a gap between the functional face of the glass fiber plate (100) and the inner side of the abutting portion (212) of the channel (210) is the plug-in connection space.

8. A filament lamp string, wherein the filament lamp string comprises a plurality of lighting units, the plurality of lighting units are connected in series or in parallel to each other, the lighting units each comprise a lamp holder (400), a lamp cover (500) and the filament light source assembly according to claim 1, the bottom of the lamp cover (500) is fixedly connected to the lamp holder (400), two conductive posts (600) provided vertically and parallel to each other are mounted on the lamp holder (400), the conductive posts (600) serve as the conductive terminals, and the two conductive posts (600) are placed in the plug-in connection space of the filament light source assembly, such that the two conductive posts (600) are electrically connected to the positive electrode pad (120) and the negative electrode pad (110) in a one-to-one correspondence mode.

9. The filament lamp string according to claim 8, wherein the lamp holder (400) and the plastic fixing member (200) are integrated.

10. The filament light source assembly according to claim 1, wherein the filament light source assembly further comprises a current limiting resistor (300), the current limiting resistor (300) is provided on the functional face of the glass fiber plate (100), or is provided independently of the glass fiber plate (100), and the energized loop is formed among the positive electrode pad (120), the negative electrode pad (110), the current limiting resistor (300) and the plurality of the LED chips.

* * * * *